G. W. BELL.
MEANS FOR LUBRICATING PNEUMATIC ANTIVIBRATION DEVICES FOR AUTOMOBILES.
APPLICATION FILED DEC. 8, 1914.

1,289,040.

Patented Dec. 24, 1918.
9 SHEETS—SHEET 1.

WITNESSES:
Chas. W. Stauffiger
Anna M. Dorr.

INVENTOR
George William Bell,
BY
ATTORNEYS

G. W. BELL.
MEANS FOR LUBRICATING PNEUMATIC ANTIVIBRATION DEVICES FOR AUTOMOBILES.
APPLICATION FILED DEC. 8, 1914.
1,289,040.
Patented Dec. 24, 1918.
9 SHEETS—SHEET 2.
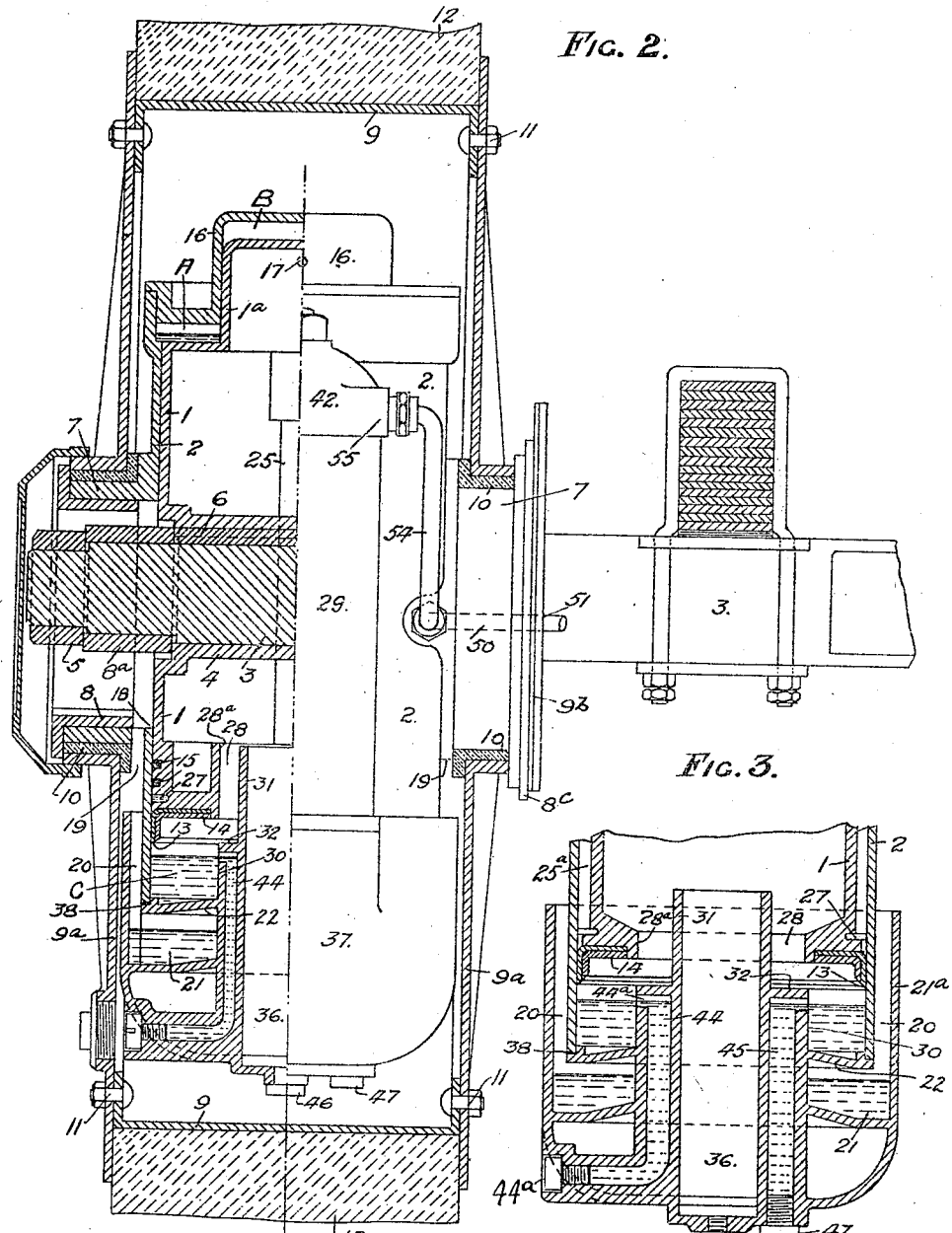
WITNESSES:
INVENTOR
George William Bell,
BY 
ATTORNEYS

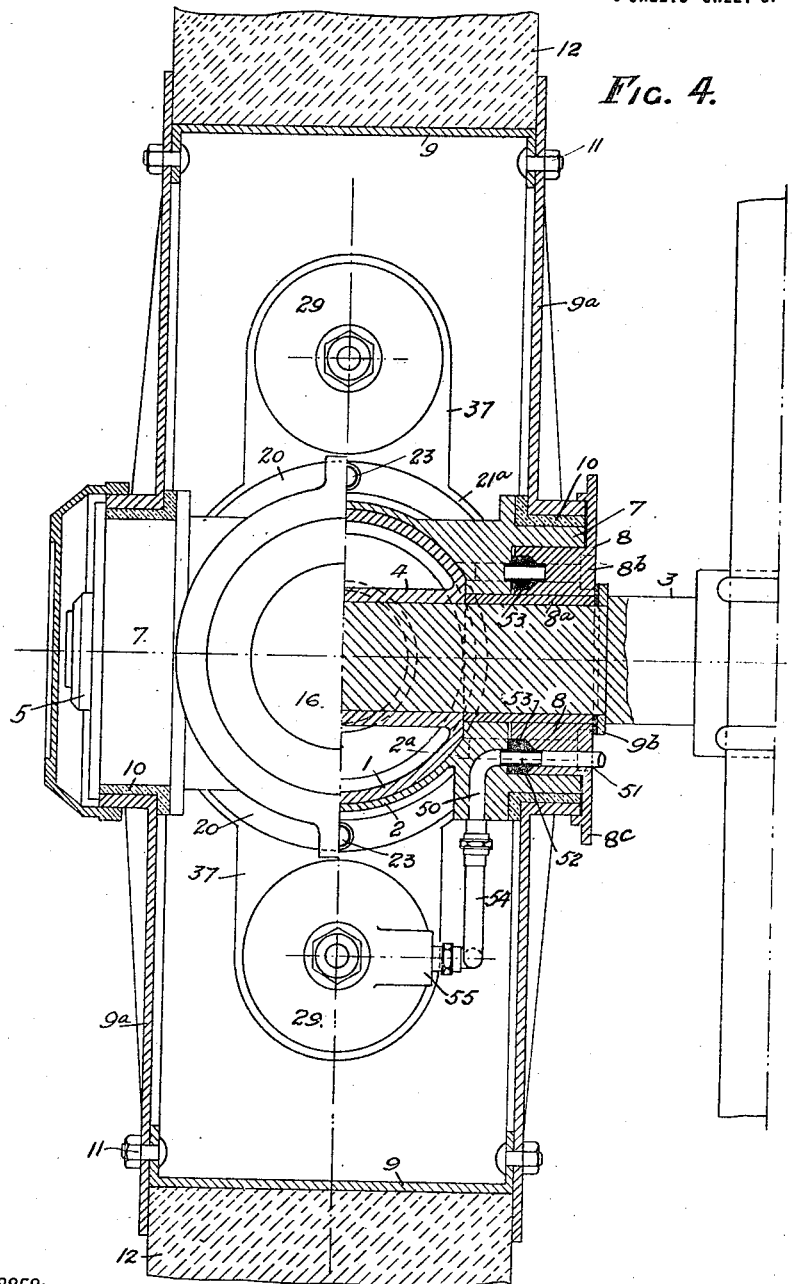

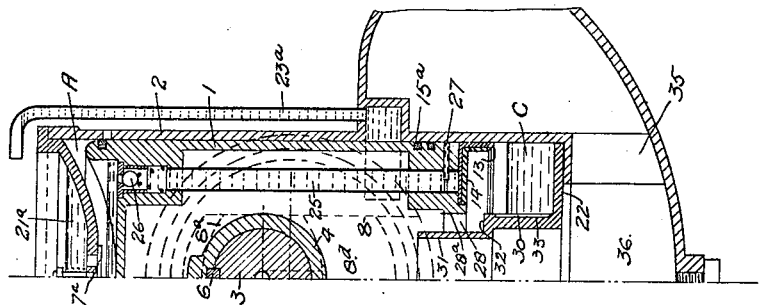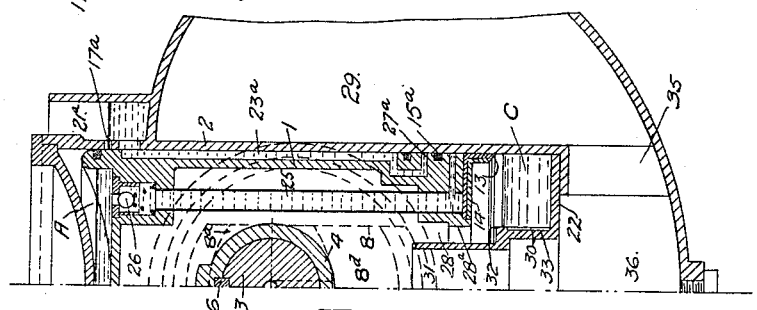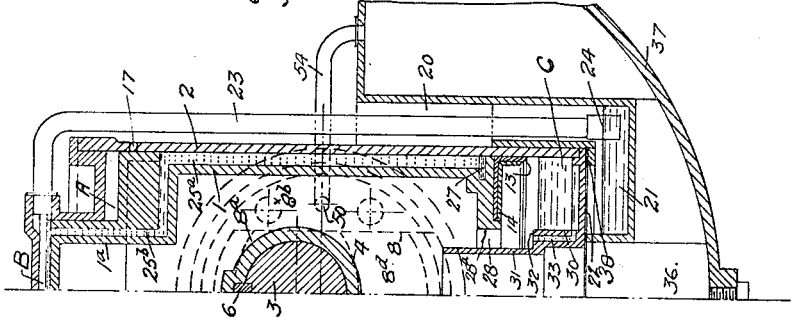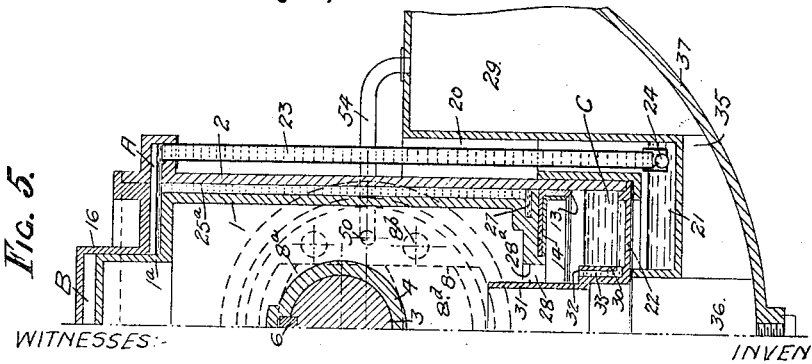

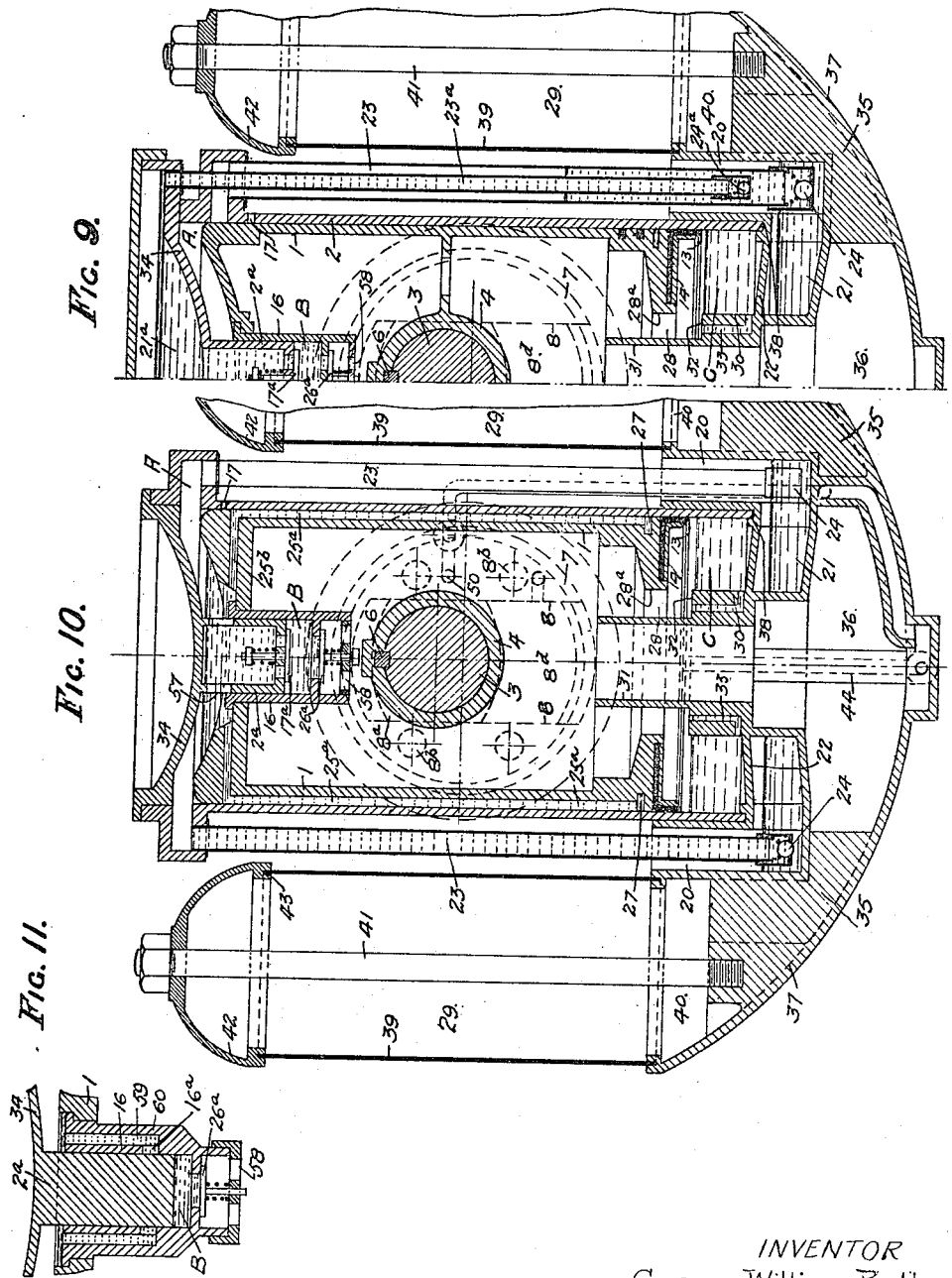

G. W. BELL.
MEANS FOR LUBRICATING PNEUMATIC ANTIVIBRATION DEVICES FOR AUTOMOBILES.
APPLICATION FILED DEC. 8, 1914.
1,289,040.
Patented Dec. 24, 1918.
9 SHEETS—SHEET 6.
Fig. 12.
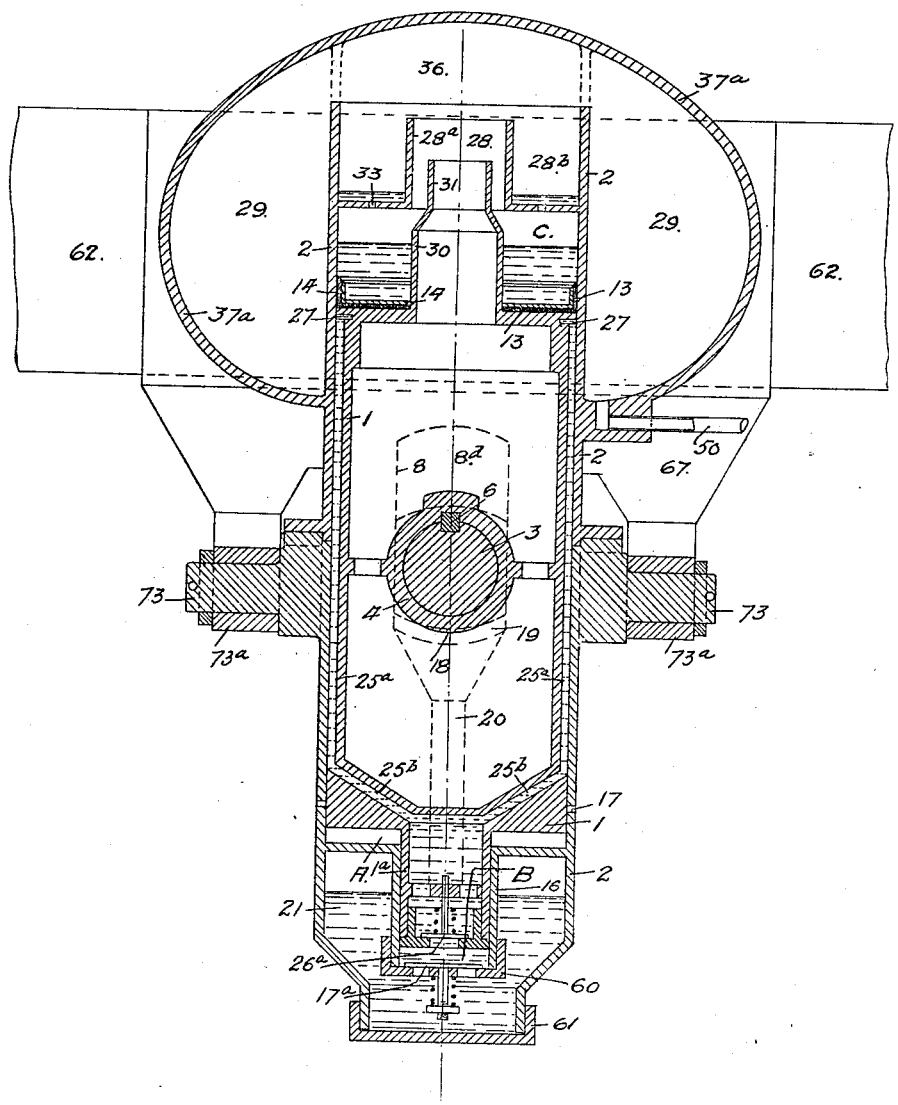
WITNESSES:
INVENTOR
George William Bell
BY
ATTORNEYS

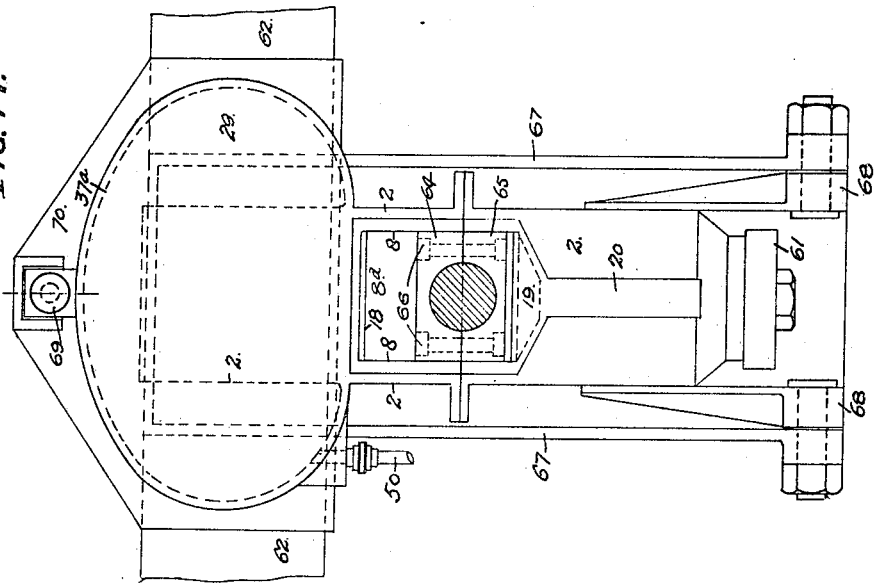

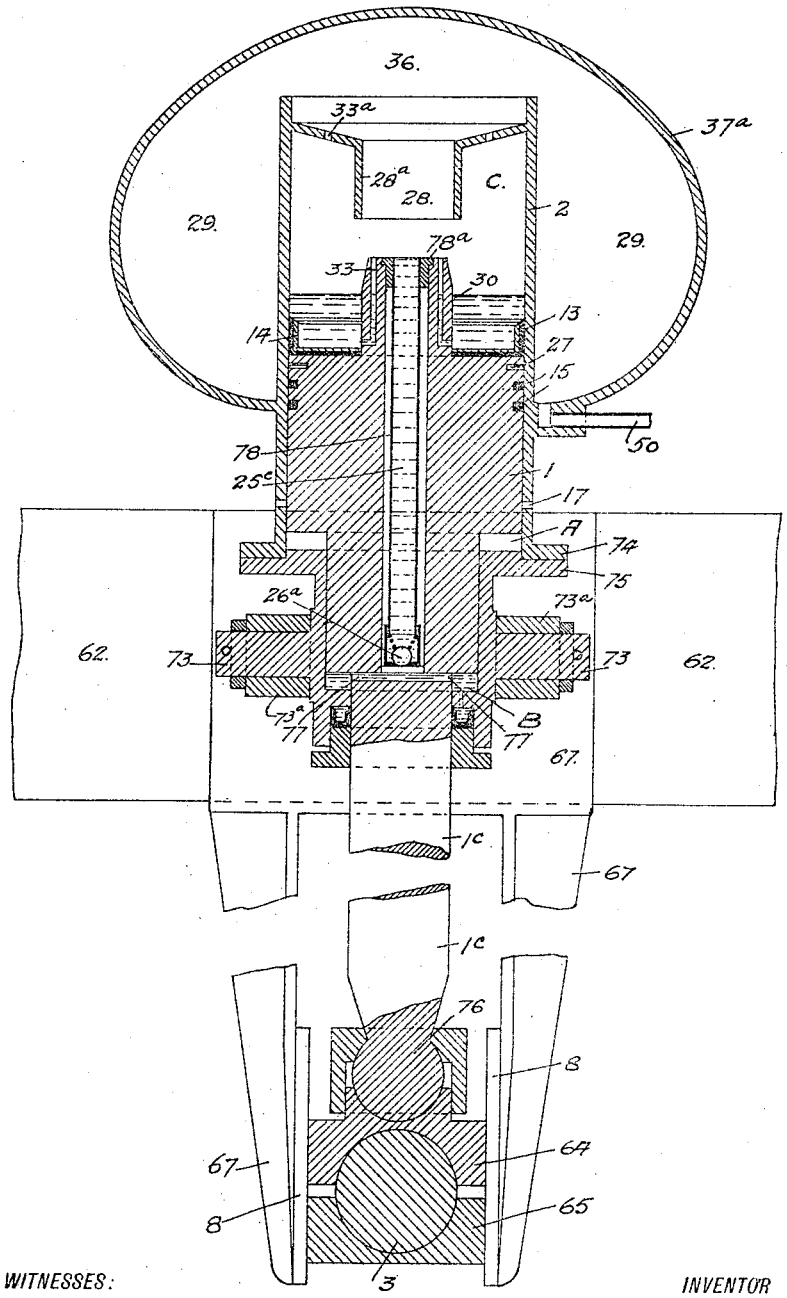

G. W. BELL.
MEANS FOR LUBRICATING PNEUMATIC ANTIVIBRATION DEVICES FOR AUTOMOBILES.
APPLICATION FILED DEC. 8, 1914.

1,289,040.

Patented Dec. 24, 1918.
9 SHEETS—SHEET 9.

WITNESSES:

INVENTOR
George William Bell,
BY
ATTORNEYS

UNITED STATES PATENT OFFICE.

GEORGE WILLIAM BELL, OF LIVERPOOL, ENGLAND.

MEANS FOR LUBRICATING PNEUMATIC ANTIVIBRATION DEVICES FOR AUTOMOBILES.

1,289,040.  Specification of Letters Patent.  Patented Dec. 24, 1918.

Original application filed October 14, 1910, Serial No. 587,142. Divided and this application filed December 8, 1914. Serial No. 876,176.

*To all whom it may concern:*

Be it known that I, GEORGE WILLIAM BELL, a subject of the King of England, residing at 97 Newsham Drive, Liverpool, in the county of Lancaster, England, have invented certain new and useful Improvements in or Connected With Means for Lubricating Pneumatic Antivibration Devices for Automobiles, of which the following is a specification, being a division of application Serial No. 587,142, filed October 14, 1910.

This invention relates to anti-vibration devices of the piston or plunger and cylinder type, as applied between the wheels and axles, and bodies, or wheels and bodies of automobiles and like vehicles, and has for its objects, to assist in maintaining the piston or plunger air tight in its cylinder and lubricate the device.

My invention is shown is the accompanying drawings, in which—

Fig. 2 is a cross vertical section, viewed at right angles to Fig. 1;

Fig. 3 is a detail of the lower part of the cylinder, shown in Figs. 1 and 2;

Fig. 4 is a sectional plan of Figs. 1 and 2;

Figs. 5 and 6 are cross vertical sections similar to Fig. 1, showing modified arrangement of oil duct;

Figs. 7 and 8 are sectional elevations of the same;

Figs. 9 and 10 are sections similar to Fig. 1 showing modified arrangements for returning oil to the piston packing from the reservoir;

Fig. 11 is a detail of the same;

Figs. 12 to 16 represent longitudinal sections of further modifications.

Like characters of reference denote like parts.

Figure 1:
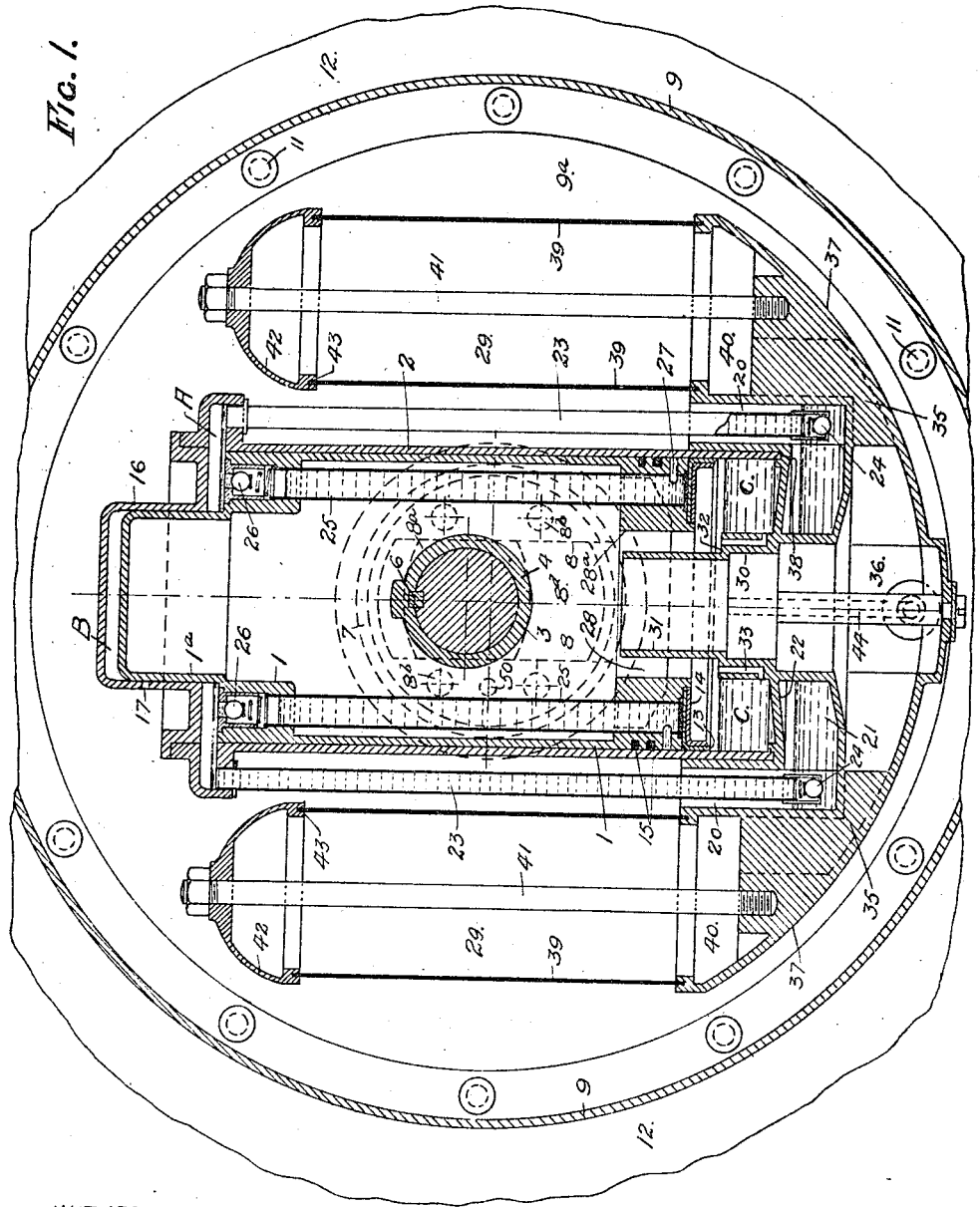
Figure 1 is a longitudinal section of a "suspension" of the type hereinbefore described, adapted to be disposed in the plane of the wheel of the vehicle.

Referring first to Figs. 1 to 4 wherein one arrangement of my invention is illustrated:—

To provide a simple form of construction for both axle and the respective parts and elements of the hub, and at the same time afford a quick method of readily detaching the wheel from the axle, the upper and lower portions of the cylinders are cast integral with one another.

I provide an axle 3 each end of which is adapted to receive a piston 1 which has a hollow cross boss 4, into which the axle 3 accurately fits, the piston being prevented from rotating by means of a key 6.

In order that the piston may be held securely in its correct position endwise, I provide sleeves $8^a$, which also act as slipper blocks in guides 8 of the wheel hub cylinder trunnions 7. The sleeve $8^a$ abuts a dust plate $9^b$ covering the slot or guide opening. The sleeve $8^a$ is provided on the outside with flat vertical faces sliding on the guides 8; at the lower part there are ports 19 communicating with the lower end of the cylinder 2, through which oil escaping from the cylinder 2 may fall into a reservoir 21.

The outer end of the axle 3 is provided with a nut 5 securing the sleeve $8^a$ to the piston, and therefore holding the wheel 12 on the axle 3.

The guides 8 in which the sleeves $8^a$ slide may be independent members in the form of castings fitting into the bore trunnions 7. Each guide 8 is held in correct parallel alinement with the cylinder 2 by means of stud bolts $8^b$, passing through the body of the guide 8 on opposite sides of the slot, and screwed into the body of the cylinder 2.

The sleeve or slippers $8^a$ are able to find correct alinement in the guides 8, by adjustment on the axle 3.

The hub portion of the wheel 9 rotates on the bush bearings 10. Access to the interior of the outer hub or wheel center 9 is obtainable by the removal of one of the side plates $9^a$ of the same, which are secured and held concentrically on the hub 9 by bolts 11; 12 represents a wheel.

Piston 1 is provided on its lower end with suitable packing 13 preferably of the cup leather type which packing is held in position by a washer 14. Piston rings 15 may in certain cases be used in conjunction therewith.

The opposite or upper face of the piston forms with the upper portion of the cylinder two oppositely-active dash-pots for absorbing shock due to excessive rebound of the parts when the wheel passes over obstructions in the road, one of said dash-pots also constituting a pump for circulating oil.

Said dash-pots are formed by an extension of reduced diameter, preferably integral with the main piston disposed within a cylinder 16 formed in the cap of the cylinder 2. The dash-pot formed by the annular space between the piston 1ª and the walls of the cylinder 2, is utilized as a force chamber to circulate the oil to the piston packing or cup leather 13, in a manner hereinafter described, and the chamber formed by the piston 1ª and the cylinder 16, is utilized for absorbing the energy or rebound, by virtue of confining air in the same, as the piston 1ª rises in the cylinder 16, and closes the ports 17, normally in free communication with the atmosphere; the ports being so arranged as to enable sufficient energy to be expended on circulating oil that may be contained in the annular dash-pot A, before the piston is brought to rest by the compression of the air in the dash-pot B.

The lubricant falls by gravity through the ports 19 above described, into a space 20 (see Fig. 3) formed by the walls 21ª of the reservoir 21 and the cylinder 2. In communication with the reservoir 21 is a tube 23 (see Fig. 1) communicating with dash-pot A and provided with a check-valve 24.

I also provide in the piston 1 and passing from the upper face in the dash-pot A, a tube 25 establishing communication and extending between the upper and lower faces of piston 1, said tube being provided with a check-valve 26 so arranged as to allow oil to pass from the top of the piston to the lower end thereof. At this lower end are provided one or more oil grooves 27.

The lower face of the piston 1 is provided with a centrally disposed aperture 28, affording air communication between the interior of the piston 1 and the cylinder 2, and also an air reservoir 29 connected therewith by passage 35. At the bottom of the cylinder, I provide a tube 30 concentric with the said cylinder and extending from the bottom of the latter into the aperture 28 of the piston 1. This tube is arranged to have its lower portion 30 accurately telescope with wall 28ª of the aperture 28, the upper portion of said tube forming a ferrule 31 of lesser diameter, and connected to the lower and larger diameter portion 30 at a shoulder 32. On the outer face of the ferrule 30, I provide one or more vertical conduits 33 (see Fig. 1) to give vent to air and oil from the annular space C formed by the walls of the cylinder 2 and said tube 30, when the piston 1 descends to the lower portion of its stroke, such oil lodging in the space 28 or inside the lower face of the piston 1.

To increase the volume of air contained in the piston 1 and cylinder 2 of the device, the reservoir 29 communicates with the said piston and cylinder through the tube or ferrule 31, and passages 35, and chamber 36 formed in the bottom cap 37, which is secured to the cylinder 2 and made air-tight by a flange-joint 38. The reservoir 29 is in this case formed of cylindrical shells 39 disposed in the plane of the wheel in such manner that the outer hub 9 may incase the same. The cylinders 39 are secured to the false bottom 37 in the opening 40 by bolts 41 and caps 42, the latter being made air-tight by means of a joint 43.

In order to provide means of renewing or supplying the proper amount of oil (in those cases in which there is no oil forced automatically to the front or high pressure side of the piston packing) to the annular space or dash-pot C, without in any way taking the hub or cylinder apart, I provide a filling conduit 44 discharging through opening 44ª (see Fig. 3) near the upper end of the tube 30 into the annular space or dash-pot C.

To insure that the proper level of oil may be maintained in the said dash-pot, I provide an overflow conduit 45 communicating with the dash-pot C at a level governed by the quantity of oil to be maintained therein.

These conduits 44 and 45 are provided at their lower extremities with airtight screw plugs 44ª and 47.

To inflate the suspension device, air under pressure may be supplied from any convenient source. A preferred method being by a compressor driven by the engine or motor supplying air under pressure to a reservoir from which the suspension devices of the vehicle are supplied with air, as required. Provision may be made for automatically unloading the air compressor, when the air in the tank reaches its normal pressure and putting it into action again, when the pressure in the tank falls a predetermined amount. In lieu of the above, I may utilize the pressure of the exhaust gases from the engine through a suitable reservoir.

Means may be provided for automatically regulating the pressure of air in the respective suspension devices of the vehicle to the requirements and variations of the load supported so that the piston shall be maintained in the normal position of suspension in the cylinder of the device.

To make satisfactory air tight connection to the said device, in the plane of the wheel, from the source of supply, and at the same time permit of the wheel being taken off its axle without difficulty, when replacing it, or remaking the air tight joints between the piston and stub axle, I provide an air duct or conduit 50, (see Fig. 4) passing through the guide blocks above mentioned, and terminating at 51 in the face of the dust plate 8ᶜ to enable a flexible air-supply pipe to be readily attached and detached by a union joint. At the inner end of the conduit 50 I provide a gland 52 between said guide block 8 and cylinder 2ª or reservoir wall into which suitable rubber packing 53, or other form of packing is disposed. A similar gland may also be provided, if necessary, on the opposite side of the guide slot to enable an even pressure being made on the gland to make the same air tight by the bolts, which secure the latter in position; one of the glands only may be used for the air connection; the other being blank.

To establish communication between said conduit 50 and the device or air-supply reservoir 29, I provide a tube or conduit 54 having union connections adapted to connect the conduit 50 with an opening in a boss 55 of the cap 42.

In operating, assuming that the oil reservoir suction pipe 23 and oil ducts are filled with oil to the levels shown in the drawing, that the piston carrying the vehicle and load is suspended in the cylinder by air therein under the required pressure, and that the wheel meets an obstruction on the road, the piston 1 will descend in the cylinder and a partial vacuum is formed in the dash-pot or oil pump A. Oil is then caused to flow from the reservoir 21 into said tube past the check-valve 24 and over the top of the piston in the dash-pot A.

On the rebound or return stroke of the piston, the check-valve 24 is closed, and oil then in the dash-pot is forced through the check-valve 26, to the groove 27 back of the cup leather. Any excess pressure is balanced by the action of the dash-pot B, the air ports 17 being so located as to insure that pressure is exercised on the oil or lubricating fluid contained in the dash-pot A.

As the piston operates in the cylinder 2, the oil is worked out from between the piston and cylinder at point 18, where it meets the oil which may have escaped from the upper face of the piston, the whole being collected at the lower portion of the slot, and gravitating through the port 19 and opening 20 into the reservoir 21 whence it is again circulated through the suction pipe 23 and valve 24 to the dash-pot A by repeated oscillations of the piston.

An orifice 44ª is provide from which the oil may be withdrawn or supplied to the reservoir.

When the device is deflated, the piston will lie at the bottom of the cylinder, and the cup leather packing will then be immersed in the oil contained in the annular space C, thereby preserving the same.

When the vehicle is in motion, and the device is automatically inflated and in operation with the piston in its normal position, any small displacement of piston 1 within cylinder 2 will not materially increase the normal pressure of the air supporting the load. The suspension is, therefore, operating under the most sensitive condition, within a zone or displacement limited by the distance the piston may descend in its stroke or by throttling the air passage from the annular space C, as the wall 28ª begins to telescope with the tube 30, the passage becoming more restricted as the piston descends, until finally the annular space C is cut off from the interior of the piston, cylinder or reservoir, and the pressure of air confined in the annular space C therefore, rises more rapidly due to the diminished space and acts as a supplementary dash-pot coming finally into operation to prevent final concussion, should the vehicle meet with considerable shock; or should the device become deflated through the leakage.

By providing the small vents 33 in the face of the piston, the oil may slowly escape, and if the impetus be great enough to cause the piston to be forced to the lowest position of its stroke, the shock is finally dissipated, the oil when the piston resumes its normal position returning by gravity to the annular chamber C.

When the device is deflated and the lower face of the piston rests in the oil in the dash-pot C, and air is then supplied to the device for inflation, the incoming pressure of air will be effectively exerted on the full area of the piston through the vents 33.

Referring to Fig. 5, a similar arrangement to Figs. 1 and 2 is illustrated, showing a modification or substitution of a vertical groove 25ª located on the face of the piston, at a point on the periphery farthest from the guide slot 8ᵈ, connecting the dash-pot A, which also constitutes a pump, with groove 27 thereby forming a conduit for the oil passing from the dash-pot to the cup leather packing, and means for lubricating the piston.

In the modification shown in Fig. 6 the dash-pot B is utilized to pump oil from the reservoir 21 to the groove 27, at the back of the cup leather packing of the lower face of the piston by means of conduit 23 fitted with a valve 24 at its lowest extremity in the oil reservoir 21, and communicating with the inner dash-pot B. A conduit 25ᵇ connecting with the groove 25ª in the face of the piston, is adapted to allow oil from the reservoir being drawn through foot valve 24, and conduit 23, into dash-pot B, as the piston descends in the cylinder of the device, due to meeting obstructions in the road, such oil being then forced from said dash-pot, by the rebound action of the piston, as it descends in its cylinder, to said groove 27 and to the back of the cup leather 13 or packing.

The outer annular air dash-pot is provided with ports 17 opening to the atmosphere at a suitable position, to enable unabsorbed rebound being taken up on same.

The reservoir or receiver need not necessarily be located below the point of escape of oil from immediately above the piston packing, but in some cases, may be located above viz., at the upper end of the cylinder either on the sides of the cylinder, as shown in Fig. 7 or in the cap as shown in Fig. 8, such reservoir as shown, being in communication with one or more dash-pots acting as oil pumps to circulate the oil as already described, by ports or valves 17$^a$; any oil escaping from the packing at 15$^a$ may collect in an annular closed space 27$^a$ in the face of the piston 1 or cylinder 2, and communicating with said reservoir 21$^a$ by means of ducts or grooves 23$^a$, in the face of the piston 1 or cylinder 2, or through tubes located in the body of the piston 1, or external to the cylinder 2. In this manner, oil escaping from the packing at the point 15$^a$ under pressure exerted by the upward rebound of the piston 1 in the oil circulating dash-pot A or dash pots, on its upward stroke, may be forced to the said reservoir 21$^a$ and be again drawn into the dash-pot or pump A through ports or valves 17$^a$, on the downward stroke of the piston to be circulated as described.

Referring to Fig. 9:—This figure illustrates a modified suspension device wherein the piston supports the vehicle and load on air under pressure in cylinder 2 of the device, such load being supported by the piston by means of axle 3 resting in the sleeve 4. The dash-pot between the upper face of the piston 1 and cylinder 2, is divided into two dash-pots A and B, which also constitute pump or pumps, the upper portion of the cylinder or cap 34 being concave and capable of forming a reservoir for oil. Disposed at the opposite end of the cylinder, and below the floor of the same, I provide an oil reservoir 21 in communication with the port 19 in the nave of the wheel which may collect oil which has escaped from between the piston and cylinder of the device, at 18. Communicating between the lower oil reservoir 21 and the outer annular dash-pot A, I provide a tube or conduit 23 forming an oil reservoir, such tube 23 being fitted with a check-valve 24 located at the lowest extremity, and at the lower part of the reservoir 21. Disposed in the tube 23 and communicating with the lower extremity thereof, through valve 24$^a$, is a tube 23$^a$ communicating with the reservoir 21$^a$. In the upper face of the piston there is provided the cylinder 16 preferably screwed into piston 1 to form the inner dash-pot B; a piston 2$^a$, integral with the cap 34, forming the upper reservoir 21$^a$, is provided to operate in the inner dash-pot cylinder 16, such piston having free communication through the same, and a check-valve 17$^a$ located in its face, to the inner dash-pot or pump B. A spring controlled delivery valve 26$^a$ is provided in the lower face of the cylinder 16, which valve is adapted to allow oil being forced from dash-pot B, to the inside of the piston or pressure side of the cup leather packing 13. Communicating with the upper oil reservoir 21$^a$, I provide a duct or conduit (not shown) leading from the upper oil reservoir 21$^a$, to any desired point, in the upper part of the cylinder 2, adapted to admit oil for lubrication purposes to the oil grooves in the upper portion of the piston face. Air ports 17 are provided in wall of cylinder 2 to admit of the air in the outer annular dash-pot being cut off from the atmosphere for purpose of cushioning. In the lower portion of the cylinder, the tube ferrule 30 telescopes with the sleeve 28$^a$, for the purpose of forming an annular dash-pot C, between the lower wall of cylinder 2, and the said tube for the purpose specified.

In operation, as the piston 1 descends in the cylinder 2 of the device due to obstruction on the road, a partial vacuum is created in the outer dash-pot A, causing oil in the lower reservoir 21 to be drawn into the tube or receiver 23, through a valve 24; on the rebound of the piston in the cylinder, piston 1 rises, until the air port 17 is cut off, the remaining air in the dash-pot and tube or receiver 23, communicating therewith, being compressed forcing oil from the receiver 23 into the connecting tube 23$^a$, through a valve 24$^a$ located on its lowest extremity, to reservoir 21$^a$, located above the inner dash-pot or pump B. The oil in the reservoir 21$^a$, being in communication with the dash-pot or pump B through valve 17$^a$, when piston 1 descends in cylinder 2, oil is drawn through said valve into dash-pot or pump B from reservoir 21$^a$, and as the piston rises the oil contained therein is forced through the delivery valve 26$^a$, located in the lower face of the dash-pot cylinder 16 to the inner or pressure side of piston packing 13, or to the inside of the device, such oil falling from the delivery valve through suitable aperture over the sleeve 4 on the axle through apertures, to the space formed by the lower portion of piston 1. The oil falls by gravity to the lower portion of the annular dash-pot C, when the piston is in its normal position of suspension; the level of the oil in the annular dash-pot C may be maintained, if desired, at a level sufficiently high as to constantly immerse the cup leather of the lower face or packing; under such circumstances, sufficient space is provided to allow of the oil being freely forced by the descending piston into such passage, until cut off at the desired point by the telescoping of the ferrule 30, by sleeve 28$^a$, when the oil in the dash-pot C, is forced through the restricted orifices or vents 33, into the annular space in the lower part of piston thereby cushioning and bringing the piston to rest: on the rebound, the oil again flows from the lower part of the piston back to the annular dash-pot C in the manner described. As the piston 1 oscillates in the cylinder 2 against the pressure of air contained therein, such oil as may escape past the cup leather or packing or grooves, in the piston wall, will collect in the lower portion of the space $8^e$ formed by the guides at the point 18, and pass therefrom through port or ports 19 to the lower reservoir 21, where it is again circulated as described. I prefer, however, to maintain the level of oil in the bottom of cylinder 2, by limiting the amount of oil in the cylinder so as to insure the level being maintained at a point that will enable a certain volume of air to be disposed between the lower face of the piston 1 and said oil level, thereby allowing any excess of oil to overflow and fall to the lower part of the air passages or reservoir 36, from whence it may be withdrawn from the device with the excess of air when the reduction in the load supported by the same necessitates the pressure being reduced proportionately to the reduction of the load, such oil escaping being returned to the reservoir or receiver if desired, to again be drawn into circulation.

Fig. 10 shows a similar device to that shown in Fig. 9 wherein provision is made for supplying oil to the back of the cup leather or packing of the lower face of the piston and to the front or pressure side of the cup leather or packing of same, simultaneously, by the action of piston 1 in cylinder 2 of the device.

The ferrule 30 forms a conduit to connect the interior of the piston and cylinder of the device to that of the air reservoir 29.

The upper dash-pot is divided into two parts, an outer annular part A and an inner part B, the outer dash-pot A connected by means of tubes 23 fitted with a check-valve 24 at its lowest extremities and communicating with the lower portion of the oil reservoir 21, adapted to admit oil from said reservoir to the outer annular dash-pot A. In the piston is provided a cylinder 16, forming with the piston $2^a$ the inner dash-pot or pump B. In the upper walls of the piston $2^a$ there are provided ports or apertures 57 communicating with the outer annular dash-pot A and the inside of the piston $2^a$. On the lower face of the latter I provide an oil inlet valve $17^a$ permitting communication from the inside of piston $2^a$ to the inside of the dash-pot or pump B. There is a delivery valve $26^a$ in the lower face of the cylinder 16 of the dash-pot, adapted to allow oil being forced from the dash-pot or pump B to the pressure side of the cup leather or packing; or into the device.

Communicating with the lower portion of the outer annular dash-pot A there is provided a passage $25^b$ and groove $25^a$ down the face of the piston.

In action, as piston 1 descends in cylinder 2, a partial vacuum is created in the outer annular dash-pot A, causing oil to be drawn from the reservoir 21, through the foot valve 24 and tube or conduit 23, to said dash-pot A. The oil collects in the lower portion of the upper face of the piston 1, and passes through apertures 57 in the piston $2^a$ of dash-pot or pump B, through the valve $17^a$ and also through passages $25^b$ and groove $25^a$ to the groove 27 behind the cup leather or packing. As the piston 1 rises in the cylinder 2 of the device, due to rebound, the oil contained in the inner dash-pot B is forced into the pressure side of the cup leather or packing through valves $26^a$ and apertures 58 to the lower part of cylinder 2 in the manner described with reference to Fig. 9, and the oil in dash-pot A is forced to the grooves 27 behind the cup leather by the increased pressure of air in said dash-pot being exerted on the surface of the oil as the piston rises and cuts off the air ports 17, the upper face of the piston having small vertical grooves permitting the escape of such air slowly from the dash-pot A to the port or ports 17, so that when the piston descends quickly sufficient rarefication takes place in said annular dash-pot A to enable oil to be raised or pumped from the reservoir 21 in the manner described.

Referring to Fig. 11 an alternative design of the inner dash-pot, which also constitutes a pump B, is shown. In this arrangement the cylinder 16 is surrounded by an annular space 59 formed by a cylinder 60, which is integral with the cylinder 16, and is disposed in the piston 1 and secured to the face thereof.

Disposed within the cylinder 16, and operating in the same there is disposed a solid piston $2^a$ integral with the cap or upper end of the cylinder 2 or cap 34 of the device. In the wall of the cylinder 16, and communicating with the passage 59 there is provided a port $16^a$ adapted to allow oil to pass into the lower portion of the cylinder 16 or the dash-pot when the piston 1 descends to a certain position in the cylinder 2. On the upward stroke the oil contained in the lower part of the cylinder 16 or dash-pot B, is forced to the pressure side of the cup leather or packing disposed on the lower face of the piston 1 through the delivery valve $26^a$ and openings 58, in the manner already described in connection with Fig. 9.

In the modification shown in Fig. 12, the weight of the vehicle and load is supported by the cylinder on the air under pressure within the device, piston 1 in this instance being inverted and having a cup leather or packing on the upper face of the piston, the dash-pot being formed between the lower face of the piston and the lower end of the cylinder.

On the upper face of the piston 1, I provide cup leather or packing 13 secured in position in any convenient manner. Extending from the face of the piston 1 is a ferrule 30 with conical vertical section terminating in the cylindrical extension 31.

On the upper face of the cylinder 2, I provide a sleeve 28$^a$ forming an aperture 28 adapted to telescope in the manner described with ferrule 30. Between the wall of said sleeve 28$^a$ and the upper end of the cylinder 2 of the device, is an annular space 28$^b$ having communication at the lowest extremity with the annular dash-pot C formed by the ferrule 30 and 31 and the wall of the cylinder 2, by small apertures or vents 33; the opening 28 forming means of communicating between the volume of air in the piston 1, and cylinder 2 and that of the reservoir 29, which in this instance is formed by an enveloping hood chamber 37, and made airtight with the cylinder 2 of the device.

At the lower end of the device the dash-pot is divided into two parts A and B, the outer annular dash-pot being utilized as an air dash-pot, and the inner one B as a pump for circulating oil.

For this purpose there is provided in the bottom of the cylinder 2 of the device a cylinder 16 having at its lowest extremity a cap 60 fitted with inlet valve 17$^a$ communicating with inner dash-pot or pump B, and with an oil reservoir 21 formed by an annular space between the outer wall of cylinder 16 of the dash-pot or pump B, and the lower wall of the cylinder 2 of the device; the bottom of said reservoir is formed by a cap 61 secured to cylinder 2.

Operating in the dash-pot cylinder 16 is a piston 1$^a$ preferably integral with the piston 1, and having at its lowest face a delivery valve 26$^a$ disposed to admit of oil being forced from the dash-pot or pump B, through the body of the piston 1$^a$ and passages 25$^b$ and grooves 25$^a$ in the face of the piston, to back of cup leather or packing; provision being made to collect any oil escaping from the device in a receiver 20 communicating with the reservoir 21.

In operation, as the cylinder 2 moves down on the piston 1 against the air pressure contained in the device, oil is drawn from the reservoir 21 through valve 17$^a$ into the dash-pot or pump B and on the rebound the oil contained in dash-pot B is forced through a check-valve 26$^a$ to the internal passages 25$^b$ and grooves 25$^a$ on the face of the piston, to the back of the cup leather 13 or packing, from whence it escapes to the lower portion of the slot 8$^d$, where it is collected in reservoir 20 and returned to the oil reservoir 21.

As the cylinder ascends, the upward rebound may be finally taken up by air contained in the annular dash-pot A, which has been supplied to said dash-pot through ports 17 which are cut off by the descending piston.

If such displacement be not sufficient to cause the top edge of ferrule 30 to telescope with sleeve 28$^a$, the vehicle and load will be in a "sensitive" condition of suspension. Should such displacement, however, exceed this amount the vehicle and load are brought rapidly to rest by the increasing retardation caused by the rapid increase of pressure in the dash-pot C as the piston 1 descends, the final displacement being arrested by the forcing of oil contained in the annular dash-pot C on the face of the packing 13 through the aperture 33 in the upper face in the cylinder 2 into the annular space 28$^b$ contained above. As the piston descends such oil returns by gravity.

Referring to Figs. 13 and 14, piston 1 is inverted and has a cup leather packing on its upper face, the dash-pot being formed between the lower face of the piston and the lower end of the cylinder, similar to the arrangement shown in Fig. 12. In this construction the device as a whole is disposed between the axle 3 and frame 62 of the vehicle and adjacent to the wheels 63. The piston is secured to the axle 3 longitudinally by collars 64 and 65 disposed on each side of sleeve 4 of piston 1 and adapted to hold the dust plates 9$^b$ in position, said collars 64 and 65 being secured and clamped by bolts 66 to the axle, the key 6 securing piston 1 from turning on the axle, said collars also being adapted to form slippers 64 and 65 to operate with the guides 8 in the arms of the cylinder 2 to constrain the piston and axle in the desired position in the horizontal plane.

Cylinder 2 is secured to the frame 62 by means of a bracket 67 extending below the axle 3 and pivotally connected at 68 to the bottom of said cylinder bracket and adapted to permit lateral motion in the plane of the axle against the resistance of spring 69 disposed between the upper end of the cylinder 2 and bracket 70 to admit of certain freedom of the axle to adapt itself to inequalities in the road without affecting the body.

On the upper face of the piston 1 I provide suitable packing, and a ferrule which may form a part of washer 14 used to secure the cup leather to the face of the piston.

At the lower end of the cylinder the dash-pot is divided into two parts A and B, the outer annular dash-pot A being used as an air dash-pot having ports 17 adapted to supply air to same and be cut off by the motion of the piston as required; the inner dash-pot B which also constitutes a pump, is formed by the bottom of cylinder 2 and a cylinder 16 of lesser diameter extending below the same, and provided at its lower extremity with a cap 60 having a valve 17$^a$ which communicates with the dash-pot or pump B, and an oil reservoir 21 formed in an annular chamber between the inner dash-pot or pump B and the outer walls of the cylinder 2, the bottom of the reservoir being formed by a cap 61 secured to the lower end of the cylinder 2. Operating in the dash-pot or pump B is a piston 1ª having in its lower face a delivery valve 26ª communicating with the dash-pot or pump B and conduit 25ᶜ, communicating with the upper face and pressure side of the cup leather or packing.

On the lower face of the piston and communicating with the dash-pot A is a valve 71 adapted to allow any oil that may have lodged in the lower face of the piston to be discharged into the annular dash-pot through the aperture which is normally closed by valve 71, or the excess pressure of air in the device forcing the piston into the dash-pot A until the valve is released by coming into contact with screw 72, such oil passing from the dash-pot A through the valve 71.

In operation, when the cylinder 2 descends on piston 1, oil is drawn from the reservoir 21 through valve 17ª into the dash-pot or pump B. On the return stroke of the piston the oil contained in the dash-pot B is forced through valve 26ª into the conduit 25ᶜ to the pressure side of the cup leather 13, any rebound not taken up by the action of the dash-pot or pump B being absorbed by the action of the annular dash-pot A.

Any oil escaping past the cup leather 13 passes to the upper face 18 of the slot 8ᵈ, falling down the faces of the guides, incidentally lubricating the same, and is collected through the ports 19 and receiver 20, falling through the duct to the reservoir 21 to be again circulated in the manner described.

In the modification in Fig. 15, the weight of the vehicle and load is carried on the cylinder 2 through pivotal connections 73 and 73ª secured through bracket 67 to the side frame of the vehicle, the cylinder 2 being preferably divided into two parts and secured by bolts passing through flanges 74 and 75 so permitting access to the piston packing without disturbing the connection between the cylinder and the frame of the car. The piston 1 is secured at its lowest extremity to the axle 3 by means of ball socket joint 76 formed at the end of piston rod 1ᶜ. The axle is guided in the plane of the cylinder by brackets 67 furnished with guides 8 which engage with clamps 64 and 65 forming slippers.

The dash-pot is divided into inner and outer portions A and B, the former being utilized as an air dash-pot and provided with air ports in the desired position. The dash-pot B is utilized to form an oil reservoir and circulate oil to the pressure side of the cup leather or piston 1. Communicating with the dash-pot B are passages 77 and a detachable pipe 78 fitted at its lowest extremity with a suitable delivery valve 26ª, said valve and pipe being secured in a passage through the piston 1 by ferrule 78ª secured to the tube and screwed into the face of the piston.

In lieu of the ferrule hereinbefore described, there is provided a reduced extension 30 in the piston with tapered extremity adapted to engage and telescope with the sleeve 28ª surrounding aperture 28, and forming thereby a dash-pot C.

Vents or apertures 33 or 33ª are provided in the upper face of the cylinder or piston adapted to release air or oil from the dash-pot C when the piston 1 enters the dash-pot; the oil so discharged may return by running down the inverted coned top of cylinder to the passage 28 and to the face of the piston.

In operation, when the cylinder 2 descends, when the vehicle meets obstruction in the road, the reduced portion of the piston rises out of the dash-pot or pump B. On the reverse stroke of the piston, the reduced portion of the same will force excess oil through passages 77 and 78, valves 26ª and conduit 25ᶜ to the upper side of the cup leather or packing of the piston 1.

Figure 16:
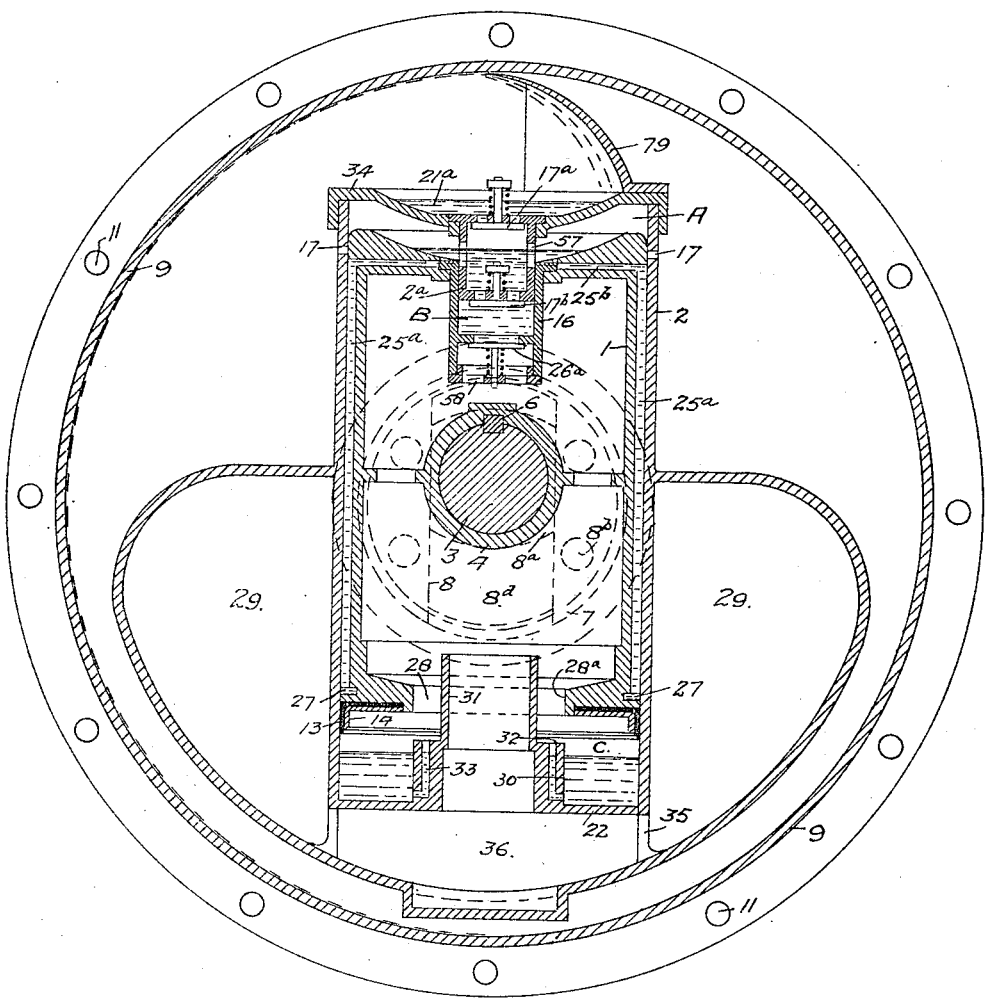

Referring to Fig. 16, the cylinder is located in the plane of the wheel and the dash-pot formed by the outer portion of the piston and cylinder is divided into two parts A and B. The inner dash-pot which also constitutes a pump, is formed by a cylinder 16 disposed in and secured to the upper face of the piston and having in its lower extremity a delivery valve 26ª adapted to allow oil to be forced from said dash-pot or pump B to the pressure side of the packing of the piston.

In the upper end of the cylinder 2, I provide a concave cap 34 forming a reservoir 21ª for oil and having at its lower extremity a piston 2ª adapted to operate in the cylinder 16 of dash-pot or pump B. In the upper end of the said piston and communicating with the reservoir 21ª and the outer dash-pot A, there is provided a valve 17ª. At the lower extremity of the said piston a second valve 17ᵇ is provided adapted to allow oil to pass from the outer annular dash-pot A through ports 57 and the body of the said piston and valve 17ᵇ to the dash-pot or pump B.

Communicating with the outer dash-pot A are passages 25ᵇ and grooves 25ª through which oil passes to the groove 27 at the back of cup leather or packing.

In the bottom 22 of the cylinder 2, there is provided a ferrule adapted to engage with sleeve 28ª of passage 28 in the piston and forms thereby an annular dash-pot C between the bottom 22 and face of piston. The ferrule is also adapted to form a free passage between the volume of air contained in the piston and cylinder and that contained in the reservoir 29 disposed on either sides of the cylinder 2. Said reservoir 29 is integral with the cylinder 2 and in communication with a passage formed by a ferrule, through passage 36 and ports 35 formed between the bottom 22 of the cylinder 2 and the outer wall 37 of the air reservoir 29.

In the wheel hub 7, guides 8 are provided to constrain the piston 1 in the cylinder 2. At the lower part of the hub 7 or slot $8^d$ there are ports 19 communicating with the lower outside portion of the cylinder 2 through which oil escaping from the piston and cylinder of the device may collect and fall into the outer revolving hub 9. The oil adhering to the inner peripheral surface is carried to the upper end of the cylinder 2 where it is scraped off into reservoir $21^a$ by the scraper 79.

In operation, as the piston 1 descends in the cylinder 2, oil is drawn into the outer annular dash-pot A by the partial vacuum formed therein through the valve $17^a$ and ports 57 and also into the inner dash-pot B through valve $17^b$ located in the lower face of the dash-pot piston B.

On the rebound of the piston 1, the oil contained in the inner dash-pot or pump B is forced through the delivery valve $26^a$ to the pressure side of the cup leather 13 or packing through openings 58 to the bottom of the dash-pot C. The oil in the outer dash-pot A is simultaneously forced as the pressure rises through the passage $25^b$ and ducts $25^a$ to the oil groove 27 at the back of the cup leather or packing on the lower face of the piston 1.

The oil from the front and back of the packing from between the piston and cylinder, together with the oil that may escape from the upper portion of the piston 1 and collecting in the lower portion of the hub or slot $8^d$, passes through ports 19 down the outside of cylinder 2, falling into the outer hub 9 and being thereafter carried to the upper end of the cylinder 2 by the revolving hub, where it is scraped into the reservoir $21^a$ by scraper 79, to be again circulated in the manner described.

In order that the suspension shall be "sensitive" to small obstructions met with on the road the augmented volume of air contained in the reservoir 29 has free and unobstructed communication with the volume of air contained in piston 1 and cylinder 2 of the device through the ferrule 30 and ports 35, so admitting of rapid influx and efflux of the air to and from the device to the reservoir 29.

Should the obstruction met by the wheel be great enough to drive the piston sufficiently far down cylinder 2 to cause ferrule 30 to engage and telescope with the sleeve $28^a$, the retarding pressure exerted on the lower face of the piston 1 will be increased by the action of the dash-pot C, thus bringing the same to rest without shock or concussion, as described.

What I claim is:—

1. In anti-vibration devices of the piston and cylinder type for automobiles, means for automatically maintaining air-tightness in the joint between the reciprocating parts and for lubricating the same and for sealing the joint of the parts, comprising oil forcing means formed by integral parts of the inter-reciprocating piston and cylinder and respectively disposed at the portion of the said piston and cylinder opposite to that part on which the air sustaining the load acts, said forcing means being operated by the relative movements of the said piston and cylinder, a lubricant receiver and means for forcing lubricant in the receiver to one or more of said forcing means.

2. In an anti-vibration device of the type described for automobiles, a cylinder, a piston reciprocated therein by the relative movements of the axle and supported parts of the vehicle thereon, air reservoirs in communication with the interior of the cylinder, dash-pots for cushioning the stroke of the cylinder and the piston at either limit of motion, and means controlled by the relative movement of the piston and cylinder for throwing the air reservoirs into communication with the cylinder during the mediate portion of the piston stroke and sealing it from the piston cylinder as the piston approaches the lower dash-pot.

3. In a pneumatic anti-vibration device for automobiles, a piston and coöperating cylinder for suspending a part relatively movable vertically on the axle, means for providing a comparatively large volume of elastic medium for maintaining the cylinder and piston in operative relation during the middle portion of the complete range of movement, the piston and cylinder being constructed to cut off a portion of the volume of the elastic medium near one end of the range of action of the piston and cylinder and to further cushion the parts at the limit of such range of action, and means for maintaining a lubricant around the sliding joint between the piston and cylinder for sealing the joints therebetween.

4. In a pneumatic anti-vibration device for automobiles, a piston and coöperating cylinder for suspending a part relatively movable vertically on the axle, means for providing a comparatively large volume of elastic medium for maintaining the cylinder and piston in operative relation during the middle portion of the complete range of movement, the piston and cylinder being constructed to cut off a portion of the volume of elastic medium near one end of the range of action of the piston and cylinder and to further cushion the parts at the limit of such range of action, means for maintaining a lubricant around the sliding joint between the piston and cylinder for sealing the joints therebetween, and means for collecting and distributing the lubricant for reuse.

5. In a pneumatic anti-vibration device for automobiles including a piston and cylinder reciprocable therewith, connecting the axle and a part supporting on and movable relative thereto, of a reservoir communicating with the interior of the cylinder and piston for augmenting the volume of elastic medium effected by the relative movement of the two, a dash-pot for cushioning the movements of the piston and cylinder as one limit of the range of motion is approached provided with a liquid cushioning lubricant, means controlled by the relative movement of the piston and cylinder and adapted to throw the reservoir into communication with the cylinder during a predetermined portion of the relative strokes of the piston and cylinder, and means for ejecting lubricant seeping from the dash-pot into the air space to the dash-pot.

6. In a pneumatic anti-vibration device for an automobile, the combination of a wheel hub and an axle therefor, of a cylinder and piston housed in the hub connected respectively to the axle and hub to permit reciprocable movement therebetween, an air reservoir housed in the hub in communication with the cylinder, said communication being controlled by the relative movement of the hub of the piston and cylinder whereby the elastic medium is increased in volume during a predetermined portion of the range of movement of the cylinder and piston and is confined in volume to the contents of the piston and cylinder alone during the remainder of the stroke, a dash-pot housed in the hub for cushioning the relative movement of the cylinder and piston at one limit of the range of motion and provided with a cushioning lubricant.

7. In a pneumatic anti-vibration device for an automobile, the combination of a wheel hub and an axle therefor, of a cylinder and piston housed in the hub connected respectively to the axle and hub to permit reciprocal movement therebetween, an air reservoir housed in the hub in communication with the cylinder, said communication being controlled by the relative movement of the hub of the piston and cylinder whereby the elastic medium is increased in volume during a predetermined portion of the range of movement of the cylinder and piston and is confined in volume to the contents of the piston and cylinder alone during the remainder of the stroke, a dash-pot housed in the hub for cushioning the relative movement of the cylinder and piston at one limit of the range of motion and provided with a cushioning lubricant, and means for returning the lubricant seeping into the air space, to the dash-pot for reuse.

8. In a pneumatic anti-vibration device for an automobile, the combination of a wheel hub and an axle therefor, of a cylinder and piston housed in the hub connected respectively to the axle and hub to permit reciprocal movement therebetween, an air reservoir housed in the hub in communication with the cylinder, said communication being controlled by the relative movement of the hub of the piston and cylinder whereby the elastic medium is increased in volume during a predetermined portion of the range of movement of the cylinder and piston and is confined in volume to the contents of the piston and cylinder alone during the remainder of the stroke, a dash-pot housed in the hub for cushioning the relative movement of the cylinder and piston at one limit of the range of motion and provided with a cushioning lubricant, and means for supplying lubricant to the dash-pot.

In testimony whereof I affix my signature in presence of two witnesses.

GEORGE WILLIAM BELL.

Witnesses:
ANNA M. DORR,
C. R. STICKNEY.

Copies of this patent may be obtained for five cents each, by addressing the "Commissioner of Patents, Washington, D. C."